(12) United States Patent
Sankrithi

(10) Patent No.: US 6,851,650 B2
(45) Date of Patent: Feb. 8, 2005

(54) TRI-BODY AIRCRAFT AND METHODS FOR THEIR MANUFACTURE

(75) Inventor: Mithra M. K. V. Sankrithi, Shoreline, WA (US)

(73) Assignee: The Boeing Company, Seattle, WA (US)

(*) Notice: Subject to any disclaimer, the term of this patent is extended or adjusted under 35 U.S.C. 154(b) by 0 days.

(21) Appl. No.: 10/271,631

(22) Filed: Oct. 15, 2002

(65) Prior Publication Data

US 2003/0052228 A1 Mar. 20, 2003

Related U.S. Application Data

(63) Continuation-in-part of application No. 09/892,275, filed on Jun. 26, 2001, now Pat. No. 6,666,406.
(60) Provisional application No. 60/215,371, filed on Jun. 29, 2000.

(51) Int. Cl.[7] .................................................. B64C 1/00
(52) U.S. Cl. ...................................... 244/119; D12/335
(58) Field of Search ............................. 244/55, 54, 87, 244/45 A, 35 R, 2.5, 117 R, 36, 13; D12/335, 336, 337

(56) References Cited

U.S. PATENT DOCUMENTS

| | | | | |
|---|---|---|---|---|
| 1,349,116 | A | * | 8/1920 | Caproni |
| 1,376,675 | A | * | 5/1921 | Caspar |
| 1,928,326 | A | * | 9/1933 | Bratu ........................... 244/55 |
| 2,224,641 | A | * | 12/1940 | Burnelli |
| D127,158 | S | * | 5/1941 | Oliver ........................ D12/335 |
| 2,242,198 | A | * | 5/1941 | Woods ........................ 89/37.16 |
| D130,651 | S | * | 12/1941 | Silverstein |
| D158,736 | S | * | 5/1950 | Frank |
| 2,994,493 | A | * | 8/1961 | Hartman |
| 3,608,850 | A | * | 9/1971 | Fredericks |
| 3,869,102 | A | * | 3/1975 | Carroll .......................... 244/36 |
| 3,913,871 | A | * | 10/1975 | Miller |
| 4,228,975 | A | * | 10/1980 | Sealey |
| 4,598,888 | A | * | 7/1986 | Beteille |
| 5,242,132 | A | * | 9/1993 | Wukowitz |
| 5,979,824 | A | * | 11/1999 | Gaglioano et al. |

FOREIGN PATENT DOCUMENTS

| | | | |
|---|---|---|---|
| DE | 1947237 | * | 4/1971 |
| FR | 812900 | * | 5/1937 |

OTHER PUBLICATIONS

"An Airplane Configuration with an Inboard Wing Mounted Between Twin Fuselages," American Institute of Aeronautics and Astronautics Publication No. 98–0440, 36th Aerospace Sciences Meeting & Exhibit, Jan. 12–15, 1998, Reno, Nevada.

* cited by examiner

*Primary Examiner*—Tien Dinh
(74) *Attorney, Agent, or Firm*—Perkins Coie LLP

(57) ABSTRACT

Aircraft, such as tri-body aircraft, and associated methods of manufacture. In one embodiment, a tri-body aircraft has a fuselage with a forward portion extending at least partially forward of an aft-mounted main wing and first and second aft portions extending at least partially aft of the main wing. The forward fuselage portion and the first and second aft fuselage portions can include passenger cabins that are connected, allowing passengers to travel between the cabins during flight. In another embodiment, the aircraft includes a propulsion system having a first engine nacelle positioned at least proximate to the first aft fuselage portion, a second engine nacelle positioned at least proximate to the second aft fuselage portion, and a third engine nacelle positioned atop an inverted V-tail extending upwardly from the first and second engine nacelles.

40 Claims, 5 Drawing Sheets

US 6,851,650 B2

TRI-BODY AIRCRAFT AND METHODS FOR THEIR MANUFACTURE

CROSS-REFERENCE TO RELATED APPLICATIONS

This application is a continuation-in-part of U.S. patent application Ser. No. 09/892,275 entitled "BLENDED WING AND MULTIPLE-BODY AIRPLANE CONFIGURATION," filed on Jun. 26, 2001, now U.S. Pat. No. 6,666,406, which application claims the benefit of U.S. Provisional Application No. 60/215,371 filed on Jun. 29, 2000 and which applications are hereby incorporated by reference in their entirety.

TECHNICAL FIELD

The following disclosure relates generally to aircraft and, more particularly, to high-speed transport aircraft having separate aft fuselage portions.

BACKGROUND

Conventional aircraft typically include a fuselage, a wing attached to a mid portion of the fuselage, and a tail-group, or "empennage," attached to an aft portion of the fuselage behind the wing. The empennage typically includes a vertical stabilizer with a movable stabilizer (i.e., a "rudder") for controlling yaw of the aircraft, and a horizontal stabilizer with another movable stabilizer (i.e., an "elevator") for controlling pitch of the aircraft. One configuration that may offer certain aerodynamic advantages over the conventional aircraft configuration is the aft-mounted main wing configuration. This configuration can include a fuselage, a main wing attached to an aft portion of the fuselage, and a smaller wing, or canard, attached to a forward portion of the fuselage in front of the main wing.

One problem with the aft-mounted main wing configuration is how to adequately balance the aircraft. For example, aircraft having aft-mounted main wings typically carry most of their passengers and/or cargo in the fuselage forward of the center of gravity ("CG"). Consequently, to balance the aircraft about the CG, such configurations typically carry as much fuel as possible in the main wing aft of the CG. This region of the main wing, however, typically houses the main landing gear assemblies, thus limiting the amount of fuel that can be carried there. As a result, the aft-mounted main wing configuration is typically nose-heavy and often requires an aerodynamic trim force to balance about the CG. This aerodynamic trim force has the disadvantage of increasing aerodynamic drag and, accordingly, fuel consumption.

Another problem with the aft-mounted main wing configuration is the difficulty associated with increasing passenger capacity with derivative configurations. For example, a well-known method for increasing passenger capacity of conventional aircraft configurations is to add a fuselage section both fore and aft of the main wing to increase fuselage length without moving the CG. On aircraft configurations having aft-mounted main wings, however, the fuselage typically extends only forward of the main wing. As a result, the only way to increase fuselage length without undertaking a major redesign is to add a fuselage section forward of the main wing. This has the disadvantage of moving the CG forward and, accordingly, increasing the aerodynamic trim force necessary to balance the aircraft.

SUMMARY

Aspects of the present invention are directed to aircraft and methods for their manufacture. In one aspect, an aircraft comprises a wing and a fuselage. The fuselage can include a forward portion, a first aft portion, and a second aft portion. The forward portion can be fixedly attached to the wing and can extend at least partially forward of the wing. The first and second aft portions can be fixedly attached to the wing and can extend at least partially aft of the wing. The first aft portion can be fixedly attached to the forward portion, and the second aft portion can be fixedly attached to the forward portion and can be at least partially spaced apart from the first aft portion.

In another aspect of the invention, the forward portion can include a forward passenger cabin, the first aft portion can include a first aft passenger cabin, and the second aft portion can include a second aft passenger cabin. The first and second aft passenger cabins can be connected to the forward passenger cabin to allow passenger travel between the first and second passenger cabins and the forward passenger cabin.

In still another aspect of the invention, a method for manufacturing an aircraft includes providing a wing and attaching a forward fuselage portion to the wing. The forward fuselage can be configured to carry passengers, cargo or both and can extend at least partially forward of the wing. The method can further include attaching first and second aft fuselage portions to the wing. The first and second aft fuselage portions can be configured to carry passengers, cargo or both and can extend at least partially aft of the wing with the second aft fuselage portion being at least partially offset from the first aft fuselage portion. The method can also include attaching the first and second aft fuselage portions to the forward fuselage portion to allow passengers to move from the forward fuselage portion to the first and second aft fuselage portions.

DETAILED DESCRIPTION

Figure 1:
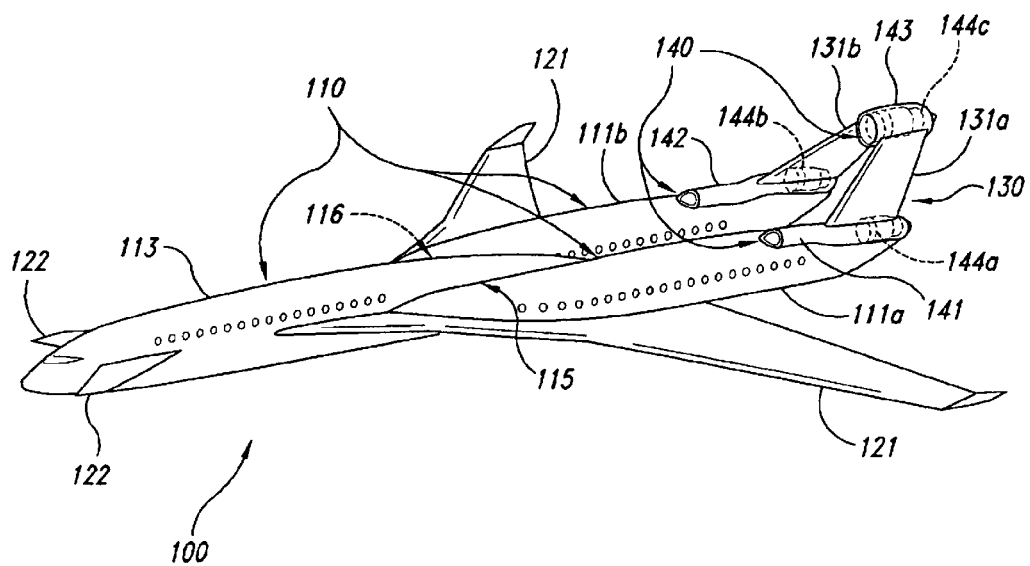
FIG. 1 is an isometric view of a tri-body aircraft configured in accordance with an embodiment of the invention.

The following disclosure describes aircraft, such as "tri-body" aircraft, and associated methods of manufacture.

Certain specific details are set forth in the following description and in FIGS. 1–7 to provide a thorough understanding of various embodiments of the invention. Those of ordinary skill in the relevant art will understand, however, that they may practice other embodiments of the invention without several of the details described below. Further, the following disclosure does not describe well-known structures and systems often associated with aircraft to avoid unnecessarily obscuring the description of the various embodiments of the invention. Any dimensions, angles, and other specifications shown in the figures are merely illustrative of particular embodiments of the invention. Accordingly, other embodiments of the invention can have other dimensions, angles, and specifications without departing from the spirit or scope of the present invention.

In the drawings, identical reference numbers identify identical or at least generally similar elements. To facilitate the discussion of any particular element, the most significant digit or digits of any reference number refer to the figure in which that element is first introduced. For example, element 110 is first introduced and discussed with reference to FIG. 1.

FIG. 1 is an isometric view of an aircraft 100 having a fuselage 110 configured in accordance with an embodiment of the invention. In one aspect of this embodiment, the fuselage 110 includes a forward fuselage portion 113 extending at least partially forward of a main wing 121, and aft fuselage portions 111 (shown as a first aft fuselage portion 111a and a second aft fuselage portion 111b) extending at least partially aft the main wing 121. A forward swept canard, or forward wing 122, is attached to the forward fuselage portion 113 forward of the main wing 121. The first aft fuselage portion 111a can be fixedly attached to the main wing 121 and a left side region 115 of the forward fuselage portion 113. Similarly, the second aft fuselage portion 111b can be fixedly attached to the main wing 121 and a right side region 116 of the forward fuselage portion 113. Accordingly, the aft fuselage portions 111 are at least partially spaced apart from each other as they extend aft from the main wing 121.

In another aspect of this embodiment, the aircraft 100 further includes a propulsion system 140 having a first engine nacelle 141 positioned at least proximate to the first aft fuselage portion 111a, a second engine nacelle 142 positioned at least proximate to the second aft fuselage portion 111b, and a third engine nacelle 143 positioned above and longitudinally offset from the first engine nacelle 141 and the second engine nacelle 142. Each of the engine nacelles 141, 142, and 143 can house an engine 144 (shown as a first engine 144a, a second engine 144b, and a third engine 144c), such as a jet or turbofan engine for providing thrust to the aircraft 100. As will be described in greater detail below, other embodiments of the propulsion system 140 can include other engine arrangements.

In a further aspect of this embodiment, the aircraft 100 also includes an empennage or stabilizer arrangement 130 having stabilizers 131 (shown as a first stabilizer 131a and a second stabilizer 131b). The first stabilizer 131a can be fixedly attached at least proximate to the first engine nacelle 141 and can extend at least generally upwardly and inwardly relative to the first engine nacelle 141 to provide support for the third engine nacelle 143. Similarly, the second stabilizer 131b can be fixedly attached at least proximate to the second engine nacelle 142 and can extend at least generally upwardly and inwardly relative to the second engine nacelle 142 to provide additional support for the third engine nacelle 143. Accordingly, in the illustrated embodiment, the stabilizers 131 form an inverted "V" shape with the apex occurring proximate to the third engine nacelle 143. The stabilizers 131 can include movable control surfaces for controlling the direction of the aircraft 100 in flight. In other embodiments, the stabilizers 131 can have other arrangements and/or the third engine nacelle 143 can have other positions. For example, in another embodiment, the third engine nacelle 143 can be omitted and the first stabilizer 131a and the second stabilizer 131b can extend in different directions away from each other.

Figure 2:
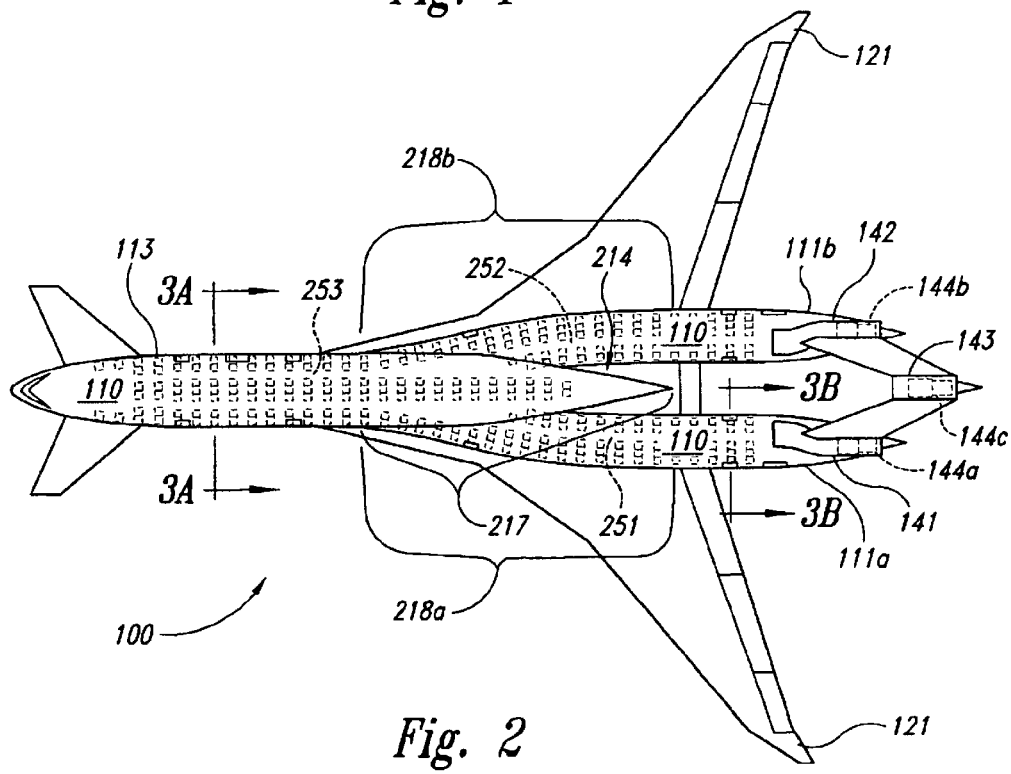
FIG. 2 is a partially hidden top view of the aircraft of FIG. 1 configured in accordance with an embodiment of the invention.

FIG. 2 is a partially hidden top view of the aircraft 100 of FIG. 1 configured in accordance with an embodiment of the invention. In one aspect of this embodiment, the forward fuselage portion 113 includes a forward passenger cabin 253, the first aft fuselage portion 111a includes a first aft passenger cabin 251, and the second aft fuselage portion 111b includes a second aft passenger cabin 252. As described above, the aft fuselage portions 111 can be fixedly attached to the forward fuselage portion 113 to connect the first aft passenger cabin 251 and the second aft passenger cabin 252 with the forward passenger cabin 253 to allow passengers to move between the different cabins during flight.

In another aspect of this embodiment, the forward fuselage portion 113 includes an aft end 214 and an aft tapering region 217 positioned toward the aft end 214. The aft tapering region 217 can reduce the aerodynamic drag of the forward fuselage portion 113. In a further aspect of this embodiment, the aft fuselage portions 111 can include forward tapering regions 218 (shown as a first forward tapering region area 218a and a second forward tapering region 218b) positioned adjacent to the aft tapering region 217. Accordingly, as the cross-sectional area of the forward fuselage portion 113 decreases toward the aft end 214, the cross-sectional areas of the aft fuselage portions 111 increase. As a result, the combined cross-sectional area of the forward fuselage portion 113 and the aft fuselage portions 111 remains at least approximately constant as the fuselage 110 transitions from the forward fuselage portion 113 to the aft fuselage portions 111. Such a cross-sectional area distribution can be beneficial to transonic area-ruling of the aircraft 100.

One feature of embodiments of the invention illustrated in FIG. 2 is that the fuselage 110 can be stretched both fore and aft of the main wing 121 by adding a forward fuselage section to the forward fuselage portion 113 and aft fuselage sections to the aft fuselage portions 111. One advantage of this feature is that passenger and/or cargo capacity can be increased without moving the CG of the aircraft 100. As a result, aerodynamic trim forces (which increase aerodynamic drag and fuel consumption) are not required to balance the stretched aircraft.

Another feature of embodiments of the invention illustrated in FIG. 2 is that the aft fuselage portions 111 prevent the drastic decrease in cross-sectional area that would otherwise occur at the trailing edge of the main wing 121 in their absence. Further, the aft fuselage portions 111 can be utilized to provide a smooth distribution of cross-sectional area along the length of the aircraft 100 aft of the main wing 121. One advantage of these features is that they help to reduce transonic wave drag by maintaining a smooth and gently curving "area ruled" cross-sectional area distribution over the length of the aircraft.

A further feature of embodiments of the invention illustrated in FIG. 2 is that the third engine nacelle 143 is longitudinally offset from the first engine nacelle 141 and the second engine nacelle 142. One advantage of this feature is that it reduces the risk of collateral engine damage in the event of a catastrophic engine rotor burst. For example, if the first engine 144a or the second engine 144b experiences a rotor burst in operation, fragments from the burst engine are unlikely to damage the third engine 144c because the third engine 144c is longitudinally offset from the probable fragment path. Similarly, if the third engine 144c experiences a rotor burst, then neither the first engine 144a nor the second engine 144b is likely to be damaged for the same reason.

Figure 3B:
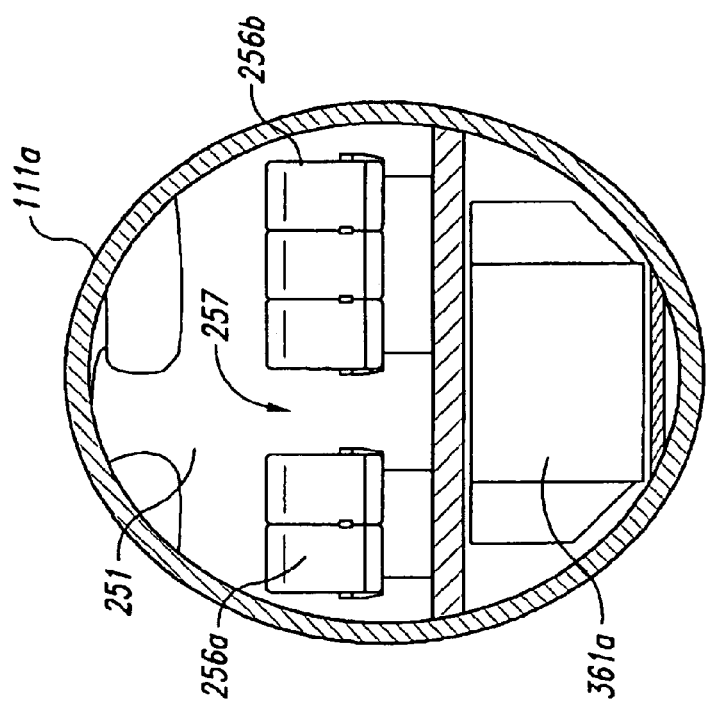
FIG. 3B is an enlarged cross-sectional elevation view of a first aft fuselage portion of the aircraft of FIG. 1 configured in accordance with an embodiment of the invention, taken substantially along line 3B—3B in FIG. 2.
Figure 3A:
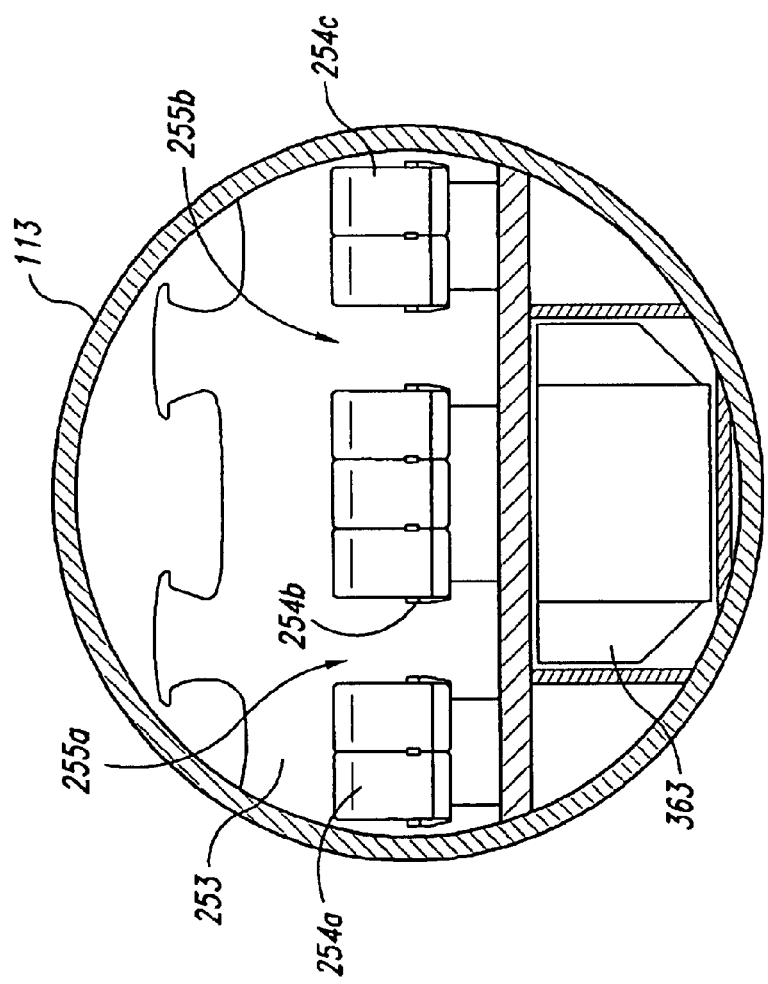
FIG. 3A is an enlarged cross-sectional elevation view of a forward fuselage portion of the aircraft of FIG. 1 configured in accordance with an embodiment of the invention, taken substantially along line 3A—3A in FIG. 2.

FIG. 3A is an enlarged cross-sectional elevation view of the forward fuselage portion 113 configured in accordance with an embodiment of the invention, taken along line 3A—3A in FIG. 2. FIG. 3B is an enlarged cross-sectional elevation view of the first aft fuselage portion 111a configured in accordance with an embodiment of the invention, taken along line 3B—3B in FIG. 2. Referring first to FIG. 3A, in one aspect of this embodiment, the forward passenger cabin 253 includes two passenger aisle 255 (shown as a first passenger aisles 255a and a second passenger aisle 255b) and three passenger seat sections 254 (shown as a first seat section 254a, a second seat section 254b, and a third seat section 254c). The first seat section 254a and the third seat section 254c can include two seats, and the second seat section 254b can include three seats for a seven-abreast seating arrangement. In other embodiments, the forward passenger cabin 253 can have other seating arrangements. For example, in another embodiment, the forward passenger cabin 253 can have a single aisle seating arrangement with three wider seats on each side.

In another aspect of this embodiment, the forward fuselage portion 113 includes a forward cargo hold 363 positioned beneath the forward passenger cabin 253. The forward cargo hold 363 can be shaped and sized to accommodate various types of cargo, such as containerized cargo (e.g., LD3-46W cargo containers as illustrated) and/or passenger luggage. In other embodiments, the forward fuselage portion 113 can have other configurations. For example, in another embodiment the forward passenger cabin 253 can be omitted and the forward fuselage portion 113 can be configured strictly as a cargo carrier.

Referring next to FIG. 3B, the first aft passenger cabin 251 can include a single passenger aisle 257 and two passenger seat sections 256 (shown as a first seat section 256a and a second seat section 256b). The first passenger seat section 256a can include two passenger seats, and the second passenger seat section 256b can include three passenger seats for a five-abreast seating arrangement. In other embodiments, the first aft passenger cabin 251 can have other seating arrangements. For example, in another embodiment the first aft passenger cabin 251 can have a single aisle seating arrangement with only two passenger seats on either side to provide wider seats and/or a wider passenger aisle.

In another aspect of this embodiment, the first aft fuselage portion 111a includes a first aft cargo hold 361a positioned beneath the first aft passenger cabin 251. The first aft cargo hold 361a can be configured to accommodate containerized cargo, such as a plurality of standard LD3-46W cargo containers as illustrated. In other embodiments, the first aft cargo hold 361a can be configured to carry other cargo, such as passenger luggage.

In a further aspect of this embodiment, the second aft fuselage portion 111b (shown in FIG. 2) can be at least generally similar to the first aft fuselage portion 111a described above with reference to FIG. 3B. For example, the second aft fuselage portion 111b can be a "mirror image" of the first aft fuselage portion 111a. In other embodiments, the second aft fuselage portion 111b can have other configurations, such as ones that differ significantly from the first aft fuselage portion 111a. For example, in another embodiment, the first aft fuselage portion 111a can be configured to carry predominantly passengers and the second aft fuselage portion 111b can be configured to carry predominantly cargo.

Figure 4:
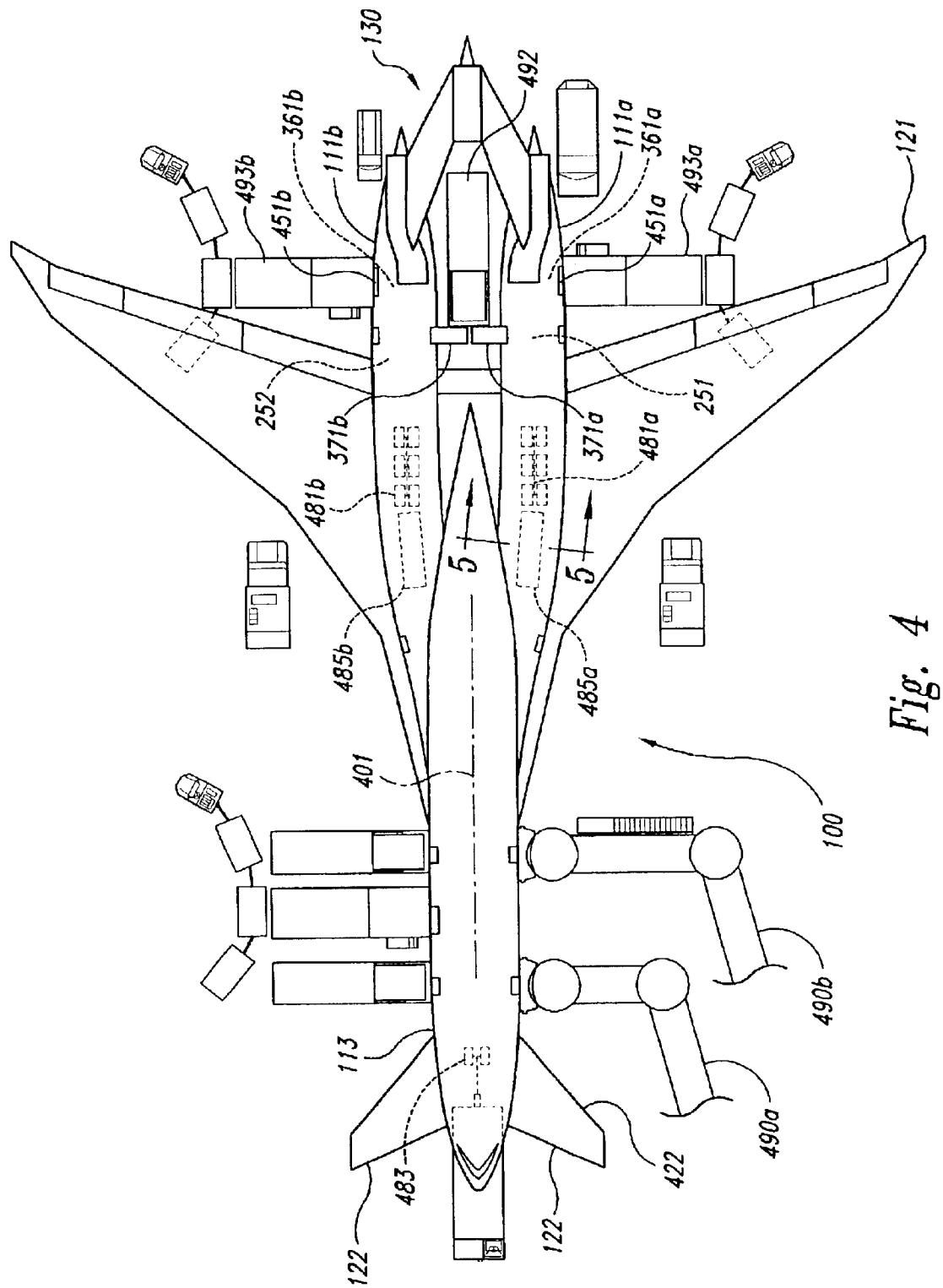
FIG. 4 is a partially hidden top view of the aircraft of FIG. 1 parked on the ground for servicing in accordance with an embodiment of the invention.

FIG. 4 is a partially hidden top view of the aircraft 100 of FIG. 1 parked on the ground for servicing in accordance with an embodiment of the invention. In one aspect of this embodiment, the forward wing 122 is smaller than the main wing 121 and has a trailing edge region 422 with a forward sweep angle. The forward sweep angle of the trailing edge region 422 can provide room for a first boarding bridge 490a and a second boarding bridge 490b to connect from a passenger terminal (not shown) to the forward fuselage portion 113. Utilizing two loading bridges instead of one can expedite the passenger loading and deplaning processes, as well as enable the use of an exclusive loading bridge for the first and business class passengers.

In another aspect of this embodiment, the first aft fuselage portion 111a includes a first loading platform 371a, and the second aft fuselage portion 111b includes a second loading platform 371b. The loading platforms 371 deploy (e.g., pivot downwardly) from their respective aft fuselage portions and open into the space between the first aft fuselage portion 111a and the second aft fuselage portion 111b. Accordingly, a galley truck 492 can be driven underneath the stabilizer arrangement 130 and positioned adjacent to the deployed loading platforms 371 to load provisions into the first aft passenger cabin 251 and the second aft passenger cabin 252.

In still another aspect of this embodiment, the first aft fuselage portion 111a includes a first cargo door 451a providing access to the first aft cargo hold 361a, and the second aft fuselage portion 111b includes a second cargo door 451b providing access to the second aft cargo hold 361b. The cargo doors 451 face outwardly from the aft fuselage portions 111 to accommodate cargo loaders 493 (shown as a first cargo loader 493a and a second cargo loader 493b) positioned outboard and adjacent to the aft fuselage portions 111. Accordingly, the first cargo loader 493a can load the first aft cargo hold 361a while the second cargo loader 493b is loading the second aft cargo hold 361b and the galley truck 492 is servicing the first aft passenger cabin 251 and the second aft passenger cabin 252.

In a further aspect of this embodiment, the aircraft 100 includes a nose gear assembly 483 positioned at least proximate to the forward fuselage portion 113, a first main gear assembly 481a positioned at least proximate to the first aft fuselage portion 111a, and a second main gear assembly 481b positioned at least proximate to the second aft fuselage portion 111b. The nose gear assembly 483 and the main gear assemblies 481 can be selectively movable between deployed static positions in which they can support the aircraft 100 on the ground and retracted static positions in which they are stowed for flight. In another aspect of this embodiment, the main gear assemblies 481 rotate forwardly and upwardly at least generally parallel to a longitudinal axis 401 for stowage in wheel wells 485 positioned in the aft fuselage portions 111 (shown as a first wheel well 485a and a second wheel well 485b). In other embodiments, the main gear assemblies 481 can have other positions on the aircraft 100 and can have other movements for retraction. For example, in another embodiment, the main gear assemblies 481 can be positioned under the main wing 121 adjacent to the aft fuselage portions 111. In one aspect of this other embodiment, the wheel wells 485 can be positioned in the main wing 121 instead of the aft fuselage portions 111.

Figure 5:
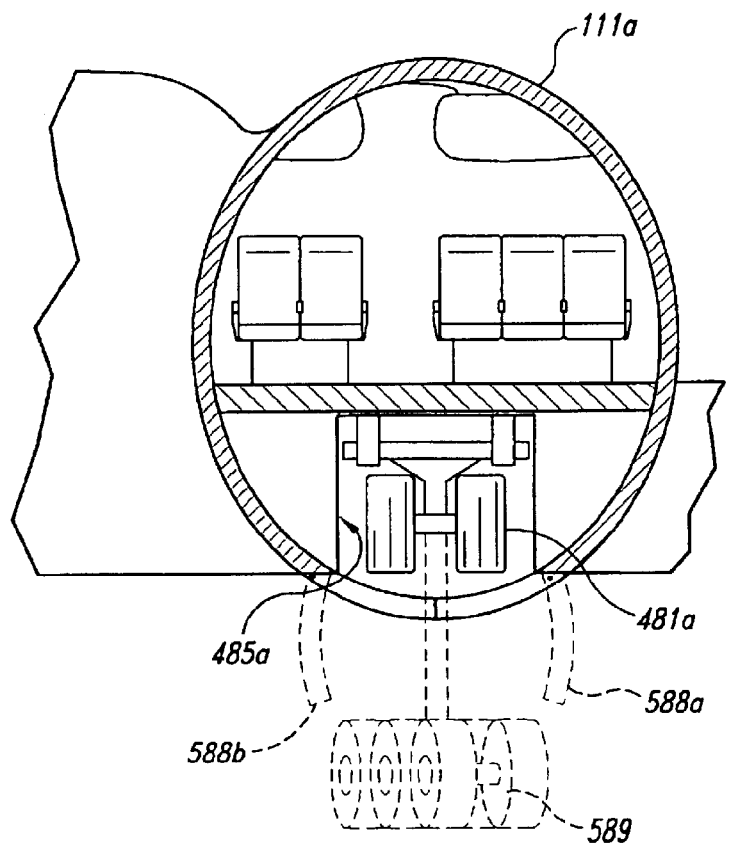
FIG. 5 is an enlarged cross-sectional elevation view of an aft fuselage portion of the aircraft of FIG. 1 showing a main gear assembly configured in accordance with an embodiment of the invention, taken substantially along line 5—5 in FIG. 4.

FIG. 5 is an enlarged cross-sectional elevation view of the first aft fuselage portion 111a showing the first main gear assembly 481a configured in accordance with an embodiment of the invention, taken substantially along line 5—5 in FIG. 4. For purposes of clarity, the first main gear assembly 481a is shown in both the deployed static position (phantom line) and the retracted static position (solid line) in FIG. 5. In one aspect of this embodiment, the first aft fuselage portion 111a includes gear doors 588 (shown as a first gear door 588a and a second gear door 588b) that open downwardly allowing a wheel truck 589 to move downwardly and aftwardly into the deployed static position. The wheel truck 589 can rotate slightly relative to the first wheel well 485a as it deploys to align with the longitudinal axis 401 of the aircraft 100 (FIG. 4). This rotation is only required if the first wheel well 485a is positioned at an angle relative to the longitudinal axis 401 as shown in FIG. 4. In other embodiments where the first wheel well 485a is aligned with the longitudinal axis 401, such rotation of the wheel truck 589 may not be required.

One feature of embodiments of the present invention as illustrated in FIG. 5 is that the main gear assemblies 481 are stowed within the aft fuselage portions 111 rather than the main wing 121. One advantage of this feature is that the main wing 121 does not have to include the additional structural reinforcement typically required to carry main gear assemblies. This leads to a much more efficient and lightweight wing structure. Another advantage of this feature is that it allows the wing to have a thinner cross-section because it does not have to accommodate retracted main gear assemblies. In some flight regimes, including a near-sonic flight regime, this thinner cross-section may result in lower aerodynamic drag and accordingly increased fuel efficiency. Yet another advantage of stowing the retracted main gear assemblies 481 in the aft fuselage portions 111 is that it increases the fuel capacity available in the main wing 121 aft of the CG.

Figure 6:
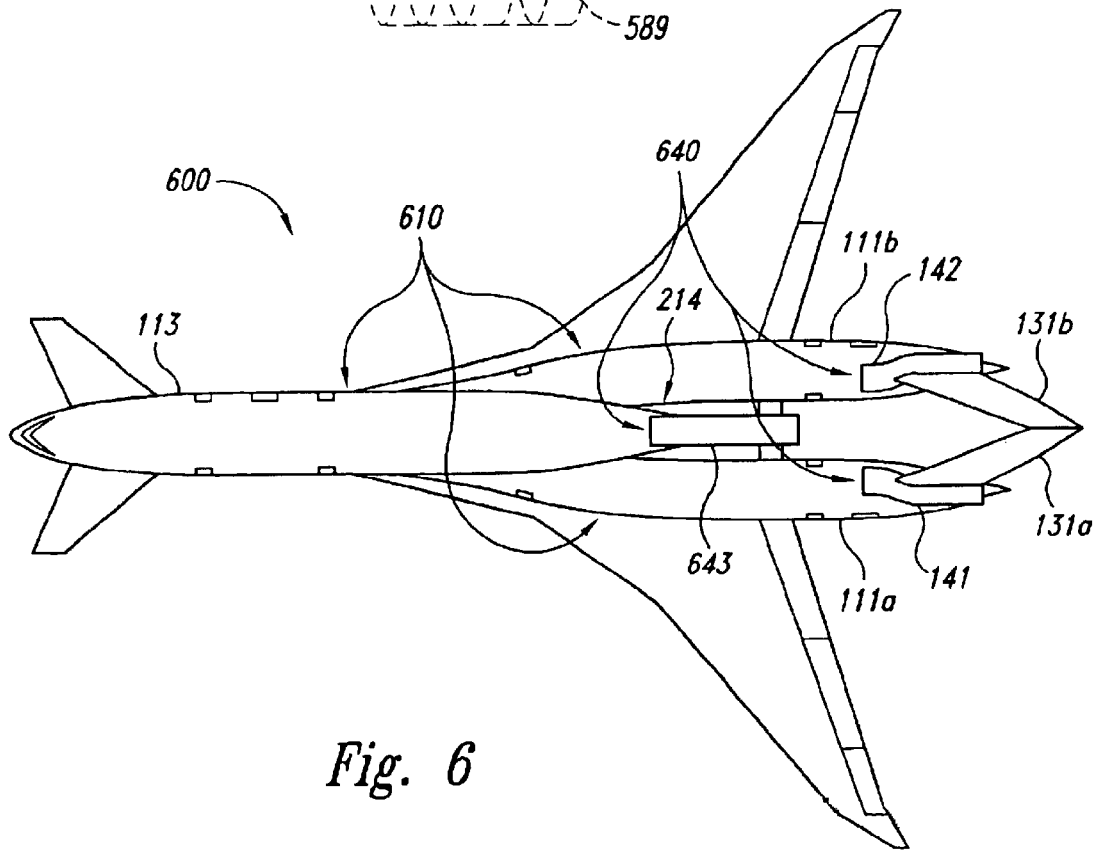
FIG. 6 is a top view of a tri-body aircraft having a propulsion system configured in accordance with another embodiment of the invention.

FIG. 6 is a top view of an aircraft 600 having a propulsion system 640 configured in accordance another embodiment of the invention. In one aspect of this embodiment, the aircraft 600 can be at least generally similar to the aircraft 100 described above with reference to FIGS. 1–5. In addition, the propulsion system 640 can include the first engine nacelle 141 positioned at least proximate to the first aft fuselage portion 111a, and the second engine nacelle 142 positioned at least proximate to the second aft fuselage portion 111b. In another aspect of this embodiment, however, the propulsion system 640 further includes a third engine nacelle 643 positioned at least proximate to the aft end 214 of the forward fuselage portion 113. The third engine nacelle 643 can be fixedly attached to the center portion of the main wing 121 in addition to the forward fuselage portion 113. In a further aspect of this embodiment, the third engine nacelle 643 includes a curved inlet duct positioned above the aft end 214 of the forward fuselage portion 113.

One feature of embodiments of the invention illustrated in FIG. 6 is that the third engine nacelle 643 is longitudinally offset from the first engine nacelle 141 and the second engine nacelle 142. As explained above with reference to FIG. 2, one advantage of this feature is that the risk of one engine bursting and damaging both of the other engines is reduced. In addition, the engine configuration illustrated in FIG. 6 may have certain aerodynamic and/or weight and balance advantages over the configuration shown in FIG. 2, which has the third engine nacelle 143 positioned atop the stabilizers 131.

Figure 7:
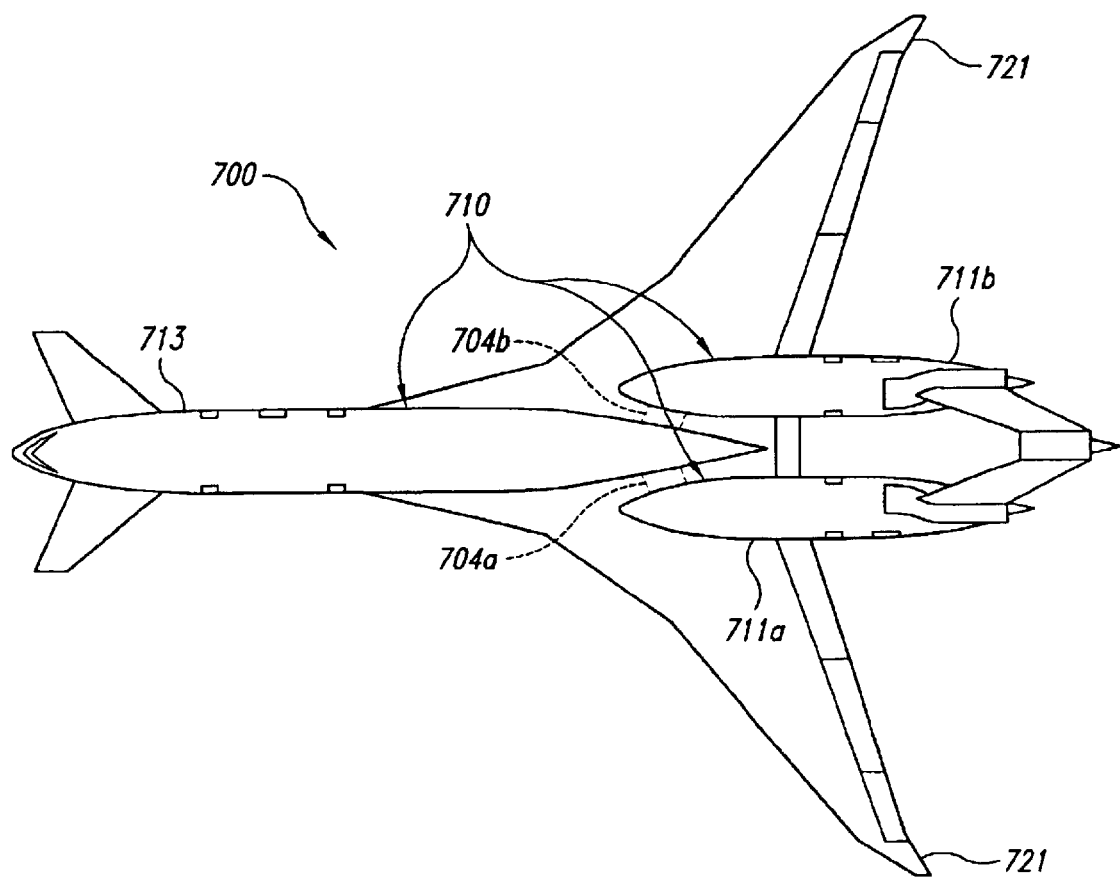
FIG. 7 is a partially hidden top view of a tri-body aircraft having a fuselage configured in accordance with a further embodiment of the invention.

FIG. 7 is a partially hidden top view of an aircraft 700 having a fuselage 710 configured in accordance with a further embodiment of the invention. In one aspect of this embodiment, the fuselage 710 is generally similar to the fuselage 110 described above with reference to FIGS. 1 and 2 and includes a forward fuselage portion 713 and aft fuselage portions 711 (shown as a first aft fuselage portion 711a and a second aft fuselage portion 711b). Unlike the aft fuselage portions 111 shown in FIGS. 1 and 2, however, the aft fuselage portions 711 are not attached directly to the forward fuselage portion 713. Instead, the aft fuselage portions 711 are fixedly attached to the main wing 721 adjacent to an aft end 714 of the forward fuselage portion 713. In a further aspect of this embodiment, passenger walkways 704 (shown as a first passenger walkway 704a and a second passenger walkway 704b) extend through the main wing 721 between the aft fuselage portions 711 and the forward fuselage portion 713 allowing passengers to move between the fuselage portions during flight.

From the foregoing, it will be appreciated that specific embodiments of the invention have been described herein for purposes of illustration, but that various modifications may be made without deviating from the spirit and scope of the invention. For example, although embodiments of the invention have been described above with reference to aircraft having aft-mounted main wings, in other embodiments, fuselage configurations in accordance with the present invention can be utilized with other aircraft configurations, such as conventional aircraft configurations having the main wing mounted forward of the empennage. In addition, although embodiments of the invention have been described above with reference to jet engines in particular arrangements, in other embodiments, other types of engines, such as propeller or turboprop engines, can be utilized in arrangements differing from those described above. Accordingly, the invention is not limited, except as by the following claims.

I claim:

1. An aircraft comprising:
 a wing;
 a forward fuselage portion fixedly attached to the wing and extending at least partially forward of the wing, the forward fuselage portion configured to carry passengers, cargo or both;
 a first aft fuselage portion fixedly attached to the wing and extending at least partially aft of the wing, the first aft fuselage portion being at least partially offset from the forward fuselage portion in a first direction, the first aft fuselage portion configured to carry passengers, cargo or both; and
 a second aft fuselage portion at least partially offset from the first aft fuselage portion, the second aft fuselage portion being fixedly attached to the wing and extending at least partially aft of the wing, the second aft fuselage portion being at least partially offset from the forward fuselage portion in a second direction opposite to the first direction, the second aft fuselage portion configured to carry passengers, cargo or both, wherein the forward fuselage portion has an aft tapering region toward an aft end, and wherein the combined cross-sectional area of the forward fuselage portion, the first aft fuselage portion, and the second aft fuselage portion is at least approximately constant in the aft tapering region of the forward fuselage portion.

2. The aircraft of claim 1 wherein the forward fuselage portion includes a forward passenger cabin, wherein the first aft fuselage portion includes a first aft passenger cabin connected to the forward passenger cabin to allow passenger travel therebetween, and wherein the second aft fuselage portion includes a second aft passenger cabin connected to the forward passenger cabin to allow passenger travel therebetween.

3. The aircraft of claim 1 wherein the forward fuselage portion has an aft tapering region toward an aft end, and wherein the first and second aft fuselage portions each have a forward tapering region at least generally adjacent to the aft tapering region of the forward fuselage portion.

4. The aircraft of claim 1 wherein the wing is a first wing, and wherein the aircraft further comprises a second wing fixedly attached to the forward fuselage portion forward of the first wing, the second wing being smaller than the first wing.

5. The aircraft of claim 1, further comprising:
a nose gear assembly positioned at least proximate to the forward fuselage portion;
a first main gear assembly positioned at least proximate to the first aft fuselage portion; and
a second main gear assembly positioned at least proximate to the second aft fuselage portion, wherein the nose gear and the first and second main gear assemblies are configured to support the aircraft on the ground.

6. The aircraft of claim 1, further comprising:
a first stabilizer fixedly attached to the first aft fuselage portion and extending at least generally upwardly relative to the first aft fuselage portion; and
a second stabilizer fixedly attached to the second aft fuselage portion and extending at least generally upwardly relative to the second aft fuselage portion.

7. The aircraft of claim 1 wherein the propulsion system includes:
a first engine nacelle positioned at least proximate to the first aft fuselage portion; and
a second engine nacelle positioned at least proximate to the second aft fuselage portion.

8. The aircraft of claim 1, further comprising an engine nacelle positioned at least proximate to an aft end of the forward portion of the fuselage.

9. An aircraft comprising:
a wing;
a forward fuselage portion fixedly attached to the wing and extending at least partially forward of the wing, the forward fuselage portion configured to carry passengers, cargo or both;
a first aft fuselage portion fixedly attached to the wing and extending at least partially aft of the wing, the first aft fuselage portion being at least partially offset from the forward fuselage portion in a first direction, the first aft fuselage portion configured to carry passengers, cargo or both;
a second aft fuselage portion at least partially offset from the first aft fuselage portion, the second aft fuselage portion being fixedly attached to the wing and extending at least partially aft of the wing, the second aft fuselage portion being at least partially offset from the forward fuselage portion in a second direction opposite to the first direction, the second aft fuselage portion configured to carry passengers, cargo or both;
a first engine nacelle positioned at least proximate to the first aft portion of the fuselage;
a second engine nacelle positioned at least proximate to the second aft portion of the fuselage; and
a third engine nacelle at least partially supported by the first and second aft portions of the fuselage, the third engine nacelle being longitudinally offset from the first and second engine nacelles.

10. The aircraft of claim 9 wherein the forward fuselage portion includes a forward passenger cabin, wherein the first aft fuselage portion includes a first aft passenger cabin connected to the forward passenger cabin to allow passenger travel therebetween, and wherein the second aft fuselage portion includes a second aft passenger cabin connected to the forward passenger cabin to allow passenger travel therebetween.

11. The aircraft of claim 9 wherein the forward fuselage portion includes a forward passenger cabin and a forward cargo hold positioned under the forward passenger cabin, wherein the first aft fuselage portion includes a first aft passenger cabin and a first aft cargo hold positioned under the first aft passenger cabin, and wherein the second aft fuselage portion includes a second aft passenger cabin and a second aft cargo hold positioned under the second aft passenger cabin.

12. The aircraft of claim 9, further comprising:
first means for providing aerodynamic control of the aircraft positioned at least proximate to a first aft fuselage portion; and
second means for providing aerodynamic control of the aircraft positioned at least proximate to a second aft fuselage portion.

13. An aircraft comprising:
a first wing having a first leading edge region with an aft sweep angle;
a fuselage fixedly attached to the first wing, the fuselage having:
a forward portion extending at least partially forward of the first wing;
a first aft portion extending at least partially aft of the first wing, the first aft portion being fixedly attached to the forward portion; and
a second aft portion extending at least partially aft of the first wing, the second aft portion being fixedly attached to the forward portion and being at least partially spaced apart from the first aft portion; and
a second wing fixedly attached to the forward portion of the fuselage forward of the first wing, wherein the second wing has a second leading edge region with a forward sweep angle.

14. The aircraft of claim 13 wherein the and second aft portions of the fuselage are configured to carry passengers, cargo or both.

15. The aircraft of claim 13 wherein the first aft portion includes a first inboard side region having a first door for personal access to the first aft portion, and wherein the second aft portion includes a second inboard side region having a second door for personal access to the second aft portion.

16. The aircraft of claim 13 wherein the first aft portion includes a first inboard side region having a first door for personnel access to the first aft portion, wherein the second aft portion includes a second inboard side region having a second door for personnel access to the second aft portion, and wherein the first and second doors are at least generally laterally aligned.

17. An aircraft comprising:

a wing;

a fuselage fixedly attached to the wing, the fuselage having:
- a forward portion extending at least partially forward of the wing and the propulsion system;
- a first aft portion extending at least partially aft of the wing, the first aft portion being fixedly attached to the forward portion; and
- a second aft portion extending at least partially aft of the wing, the second aft portion being fixedly attached to the forward portion and being at least partially spaced apart from the first aft portion;

an inverted V-tail assembly having a first stabilizer and a second stabilizer, the first stabilizer extending from at least proximate to an apex to the first aft portion of the fuselage, the second stabilizer extending from at least proximate to the apex to the second aft portion of the fuselage; and an engine nacelle positioned at least proximate to the apex of the inverted V-tail assembly.

18. The aircraft of claim 17, further comprising means for allowing passengers to move from the first aft portion to the second aft portion during flight of the aircraft.

19. The aircraft of claim 17, further comprising:

means for allowing passengers to move from the first aft portion to the forward portion during flight of the aircraft; and means for allowing passengers to move from the second aft portion to the forward portion during flight of the aircraft.

20. The aircraft of claim 17 wherein the propulsion system includes:

first means for propelling the aircraft positioned at least proximate to the first aft portion; and second means for propelling the aircraft positioned at least proximate to the second aft portion.

21. The aircraft of claim 17, further comprising:

first roller means for movably supporting at least a first portion of the aircraft on the ground, the first roller means being positioned at least proximate to the first aft portion; and second roller means for movably supporting at least a second portion of the aircraft on the ground, the second roller means being positioned at least proximate to the second aft portion.

22. An aircraft comprising:

a wing;

a fuselage fixedly attached to the wing, the fuselage having:
- a forward portion extending at least partially forward of the wing and the propulsion system;
- a first aft portion extending at least partially aft of the wing, the first aft portion being fixedly attached to the forward portion; and
- a second aft portion extending at least partially aft of the wing, the second aft portion being fixedly attached to the forward portion and being at least partially spaced apart from the first aft portion;

a first engine nacelle attached to the first aft portion of the fuselage aft of the wing; and a second engine nacelle attached to the second aft portion of the fuselage aft of the wing.

23. The aircraft of claim 22 wherein the wing is a first wing, wherein the aircraft further comprises a second wing fixedly attached to the forward portion of the fuselage forward of the first wing, and wherein the first wing is larger than the second wing.

24. The aircraft of claim 22 wherein the wing includes a leading edge region and a trailing edge region, and wherein the first and second aft portions of the fuselage are fixedly attached to the forward portion of the fuselage at least generally between the leading edge region and the trailing edge region.

25. The aircraft of claim 22 wherein the forward portion of the fuselage has a left side region and a right side region, wherein the first aft portion is fixedly attached at least proximate to the left side region, and wherein the second aft portion is fixedly attached at least proximate to the right side region.

26. The aircraft of claim 22 wherein the forward portion of the fuselage has an aft tapering region toward an aft end, and wherein the first and second aft portions each have a forward tapering region at least generally adjacent to the aft tapering region of the forward portion.

27. The aircraft of claim 22, further comprising:

a nose gear assembly positioned at least proximate to the forward portion of the fuselage;

a first main gear assembly positioned at least proximate to the first aft portion of the fuselage; and a second main gear assembly positioned at least proximate to the second aft portion of the fuselage, wherein the nose gear and the first and second main gear assemblies are configured to movably support the aircraft on the ground.

28. The aircraft of claim 22, further comprising:

a first main gear assembly positioned at least proximate to the first aft portion of the fuselage; and a second main gear assembly positioned at least proximate to the second aft portion of the fuselage, the first and second main gear assemblies being selectively movable between a deployed static position and a retracted static position, wherein the first and second main gear assemblies movably support at least a portion of the aircraft when in the deployed static position, and wherein the first main gear assembly is stowed within the first aft portion of the fuselage and the second main gear assembly is stowed within the second aft portion of the fuselage when in the retracted static position.

29. The aircraft of claim 22 wherein the fuselage further includes a longitudinal axis, and wherein the aircraft further comprises:

a first main gear assembly positioned at least proximate to the first aft portion of the fuselage; and a second main gear assembly positioned at least proximate to the second aft portion of the fuselage, wherein the first and second main gear assemblies are configured to rotate forwardly and upwardly at least approximately parallel to the longitudinal axis to move between deployed static positions, wherein the first and second main gear assemblies movably support at least a portion of the aircraft, and retracted static positions wherein the first and second main gear assemblies are stowed for flight.

30. The aircraft of claim 22, further comprising:

a first stabilizer fixedly attached to the first aft portion of the fuselage and extending at least generally upwardly relative to the first aft portion; and a second stabilizer fixedly attached to the second aft portion of the fuselage and extending at least generally upwardly relative to the second aft portion.

31. The aircraft of claim 22, further comprising an inverted V-tail assembly having a first stabilizer fixedly attached to the first aft portion of the fuselage and a second stabilizer fixedly attached to the second aft portion of the fuselage.

32. An aircraft comprising:

a wing;

a fuselage fixedly attached to the wing, the fuselage having:
  a forward portion extending at least partially forward of the wing and the propulsion system;
  a first aft portion extending at least partially aft of the wing, the first aft portion being fixedly attached to the forward portion; and
  a second aft portion extending at least partially aft of the wing, the second aft portion being fixedly attached to the forward portion and being at least partially spaced apart from the first aft portion;

a first engine nacelle positioned at least proximate to the first aft portion of the fuselage;

a second engine nacelle positioned at least proximate to the second aft portion of the fuselage;

a first stabilizer extending at least generally upwardly from the first aft portion of the fuselage at least proximate to the first engine nacelle; and a second stabilizer extending at least generally upwardly from the second aft portion of the fuselage at least proximate to the second engine nacelle.

33. The aircraft of claim 32, further comprising a third engine nacelle supported by the first and second stabilizers.

34. An aircraft comprising:

a wing;

a fuselage fixedly attached to the wing, the fuselage having:
  a forward portion extending at least partially forward of the wing and the propulsion system;
  a first aft portion extending at least partially aft of the wing, the first aft portion being fixedly attached to the forward portion; and
  a second aft portion extending at least partially aft of the wing, the second aft portion being fixedly attached to the forward portion and being at least partially spaced apart from the first aft portion;

a first engine nacelle positioned at least proximate to the first aft portion of the fuselage;

a second engine nacelle positioned at least proximate to the second aft portion of the fuselage; and a third engine nacelle at least partially supported by the first and second aft portions of the fuselage.

35. The aircraft of claim 34 wherein the third engine nacelle is longitudinally offset from the first and second engine nacelles.

36. An aircraft comprising:

a wing;

a fuselage fixedly attached to the wing, the fuselage having:
  a forward portion extending at least partially forward of the wing and the propulsion system;
  a first aft portion extending at least partially aft of the wing, the first aft portion being fixedly attached to the forward portion; and
  a second aft portion extending at least partially aft of the wing, the second aft portion being fixedly attached to the forward portion and being at least partially spaced apart from the first aft portion;

a first engine nacelle positioned at least proximate to the first aft portion of the fuselage;

a second engine nacelle positioned at least proximate to the second aft portion of the fuselage; and a third engine nacelle positioned at least proximate to an aft end of the forward portion of the fuselage.

37. A stabilizer arrangement for use with an aircraft having a fuselage, the stabilizer arrangement comprising:

a first stabilizer extending at least generally from a first aft fuselage portion;

a second stabilizer extending at least generally from a second aft fuselage portion separate from the first aft fuselage portion, the second stabilizer being positioned at an angle relative to the first stabilizer and connected to the first stabilizer in the absence of an interconnecting horizontal stabilizer; and an engine nacelle positioned at least proximate to the first and second stabilizers and offset from the first and second aft fuselage portions.

38. A stabilizer arrangement for use with an aircraft having a fuselage, a first engine nacelle, and a second engine nacelle, the stabilizer arrangement comprising:

a first stabilizer extending at least generally from a first aft fuselage portion, wherein the first engine nacelle is mounted to the first aft fuselage portion and the first stabilizer is fixedly attached at least proximate to the first engine nacelle; and a second stabilizer extending at least generally from a second aft fuselage portion separate from the first aft fuselage portion, the second stabilizer being positioned at an angle relative to the first stabilizer and connected to the first stabilizer in the absence of an interconnecting horizontal stabilizer, wherein the second engine nacelle is mounted to the second aft fuselage portion and the second stabilizer is fixedly attached at least proximate to the second engine nacelle.

39. The stabilizer arrangement of claim 38 wherein the aircraft further includes a third engine nacelle, and wherein the first and second stabilizers at least partially support the third engine nacelle.

40. The stabilizer arrangement of claim 38 wherein the aircraft further includes a third engine nacelle, and wherein the first and second stabilizers at least partially support the third engine nacelle, the third engine nacelle being longitudinally offset from the first and second engine nacelles.

* * * * *